UNITED STATES PATENT OFFICE.

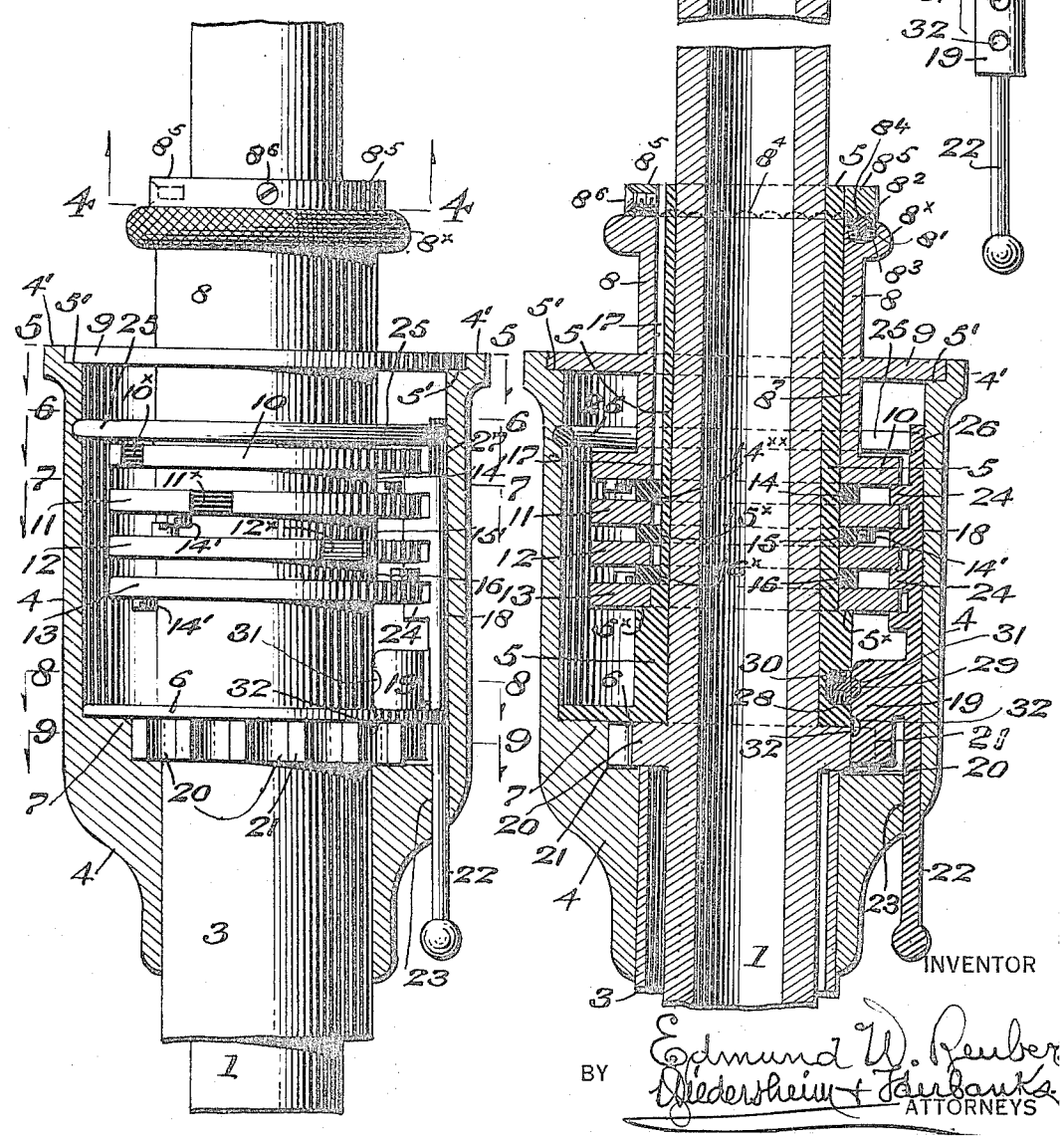

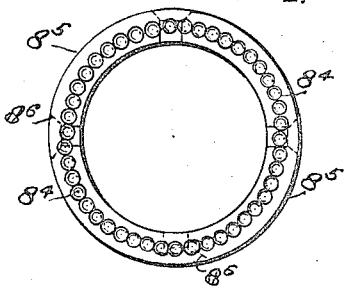
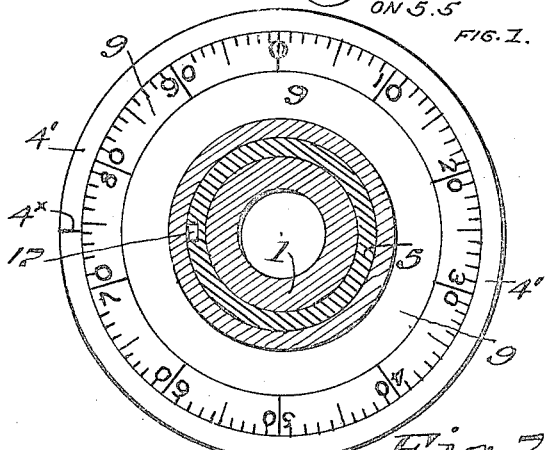
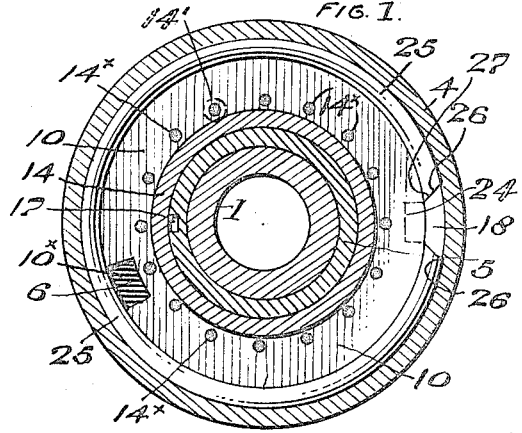
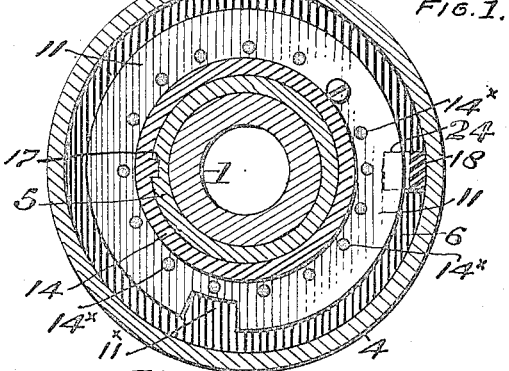
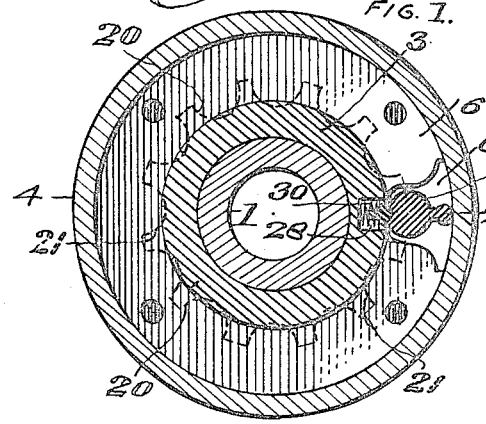
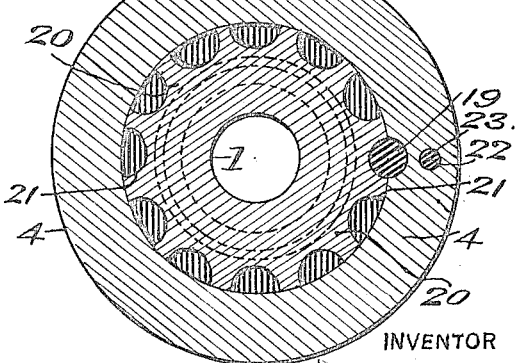

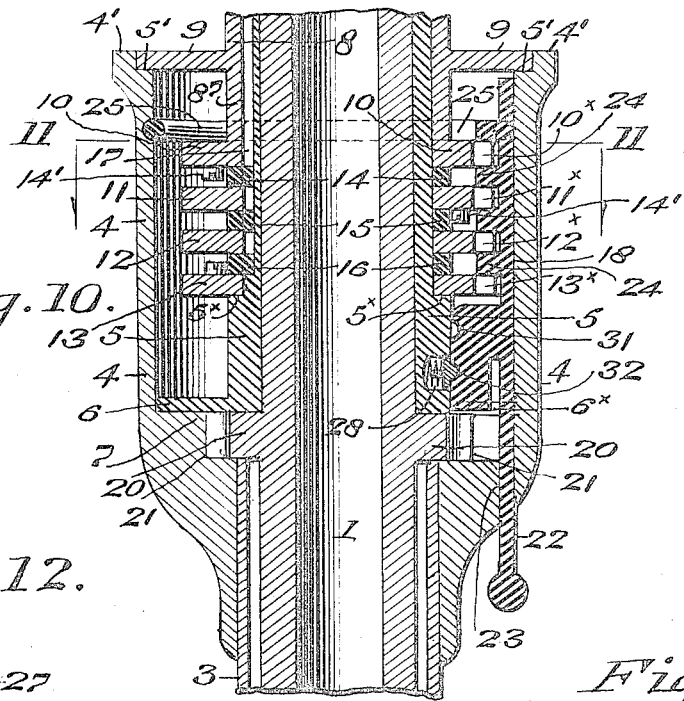
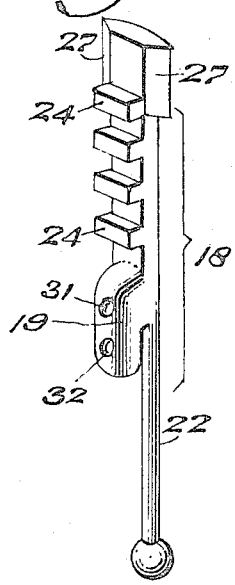
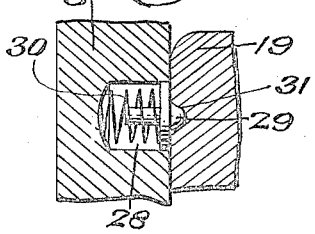

EDMUND W. REUBER, OF ALLENTOWN, PENNSYLVANIA.

PERMUTATION-LOCK.

1,254,435.   Specification of Letters Patent.   Patented Jan. 22, 1918.

Application filed April 18, 1917. Serial No. 162,823.

*To all whom it may concern:*

Be it known that I, EDMUND W. REUBER, a citizen of the United States, residing at Allentown, in the county of Lehigh, State of Pennsylvania, have invented a new and useful Permutation-Lock, of which the following is a specification.

My invention relates in general to permutation locks designed more especially for use on such steering gears as are used more particularly upon automobiles and other motor vehicles and also upon motor boats, in which a hand-controlled steering wheel occasions the oscillatory swing of a steering post or relatively rotative element which through connective mechanism controls in land vehicles the steering wheels and in water vehicles the rudder.

Although my invention is, as explained, applicable to motor boats and, indeed, broadly considered, to many types of steering mechanisms, its particular applicability is to the steering gears of automobiles of all of the various types and its object in such application is to safeguard against and render practically impossible the theft of the vehicles.

The principal application of my invention is to automobiles, and, broadly expressed, my invention comprehends the idea of so locking the steering wheel and its adjunctive devices by the application of a combination lock to the steering post, as to make any movement of the wheel and post impossible after the lock has once been set, except by the unlocking or unsetting of its combination by a person familiar with the numbering of the combination itself, that is, knowing the numbers which have in turn to be brought into match with the indicator,—with the result that were the vehicle started by an unauthorized person, it would be impossible to run it otherwise than in the direction in which the steering wheels had been set, as, for instance, around and around in a circle of some definite radius or in a directly straight-line without possibility of turning.

In other words, it being impossible to direct the vehicle by steering in a desired course, it would be equally impossible to run away with it under its own power or to drag it away by mechanical or animal motive means.

My invention further comprehends the various associated devices which effect the results I have in mind all as hereinafter fully referred to in this specification and particularly described in the claims.

For the purpose of illustrating my invention, I have shown in the accompanying drawings a certain type and embodiment of it which is at present preferred by me, because in practice it has given satisfactory and reliable results.

It is to be understood, however, that the various instrumentalities in which my invention is shown as embodied can be variously arranged, and that my invention is not, therefore, limited to the precise arrangement or, in fact, organization of the instrumentalities which are typified in the construction shown in the drawings and hereinafter described.

Referring to the drawings:—

Figure 1 represents in side elevation a lock-provided steering-gear embodying my invention,—the steering wheel and lock casing being shown in section, and the members of the lock organization and the steering post and wheel in locked position.

Fig. 2 is a central, vertical, side, sectional elevation through my entire device, the position of the parts being the same as in Fig. 1, and the steering post being locked against oscillatory or turning movement.

Fig. 3 is an inside face view of the bolt member removed from the lock casing.

Fig. 4 is a bottom plan view on line 4—4 of Fig. 1, of the socketed lug ring or collar removed from the tumbler sleeve.

Fig. 5 is a top plan view of the dial head and dial face on the line 5—5 of Fig. 1.

Fig. 6 is a horizontal top section on the line 6—6 of Fig. 1.

Fig. 7 is a horizontal top section on the line 7—7 of Fig. 1.

Fig. 8 is a horizontal top section on the line 8—8 of Fig. 1.

Fig. 9 is a horizontal top section on the line 9—9 of Fig. 1.

In all of these views and in Fig. 11, sight is to be taken in the direction of the arrows upon the enumerated dotted lines.

Fig. 10 is a view similar to Fig. 2, except that the members of the locking organization are shown in their unlocked position or that in which the wheel and steering post are free to be swung.

Fig. 11 is a horizontal top section on the line 11—11 of Fig. 10.

Fig. 12 is a perspective view of the bolt member removed from the lock casing, and Fig. 13 is an enlarged detail of one of the spring-controlled locking plungers, that operates with the bolt member being selected for illustration.

Similar numerals of reference indicate corresponding parts.

Referring to the drawings:—

1 designates a steering post or relatively rotative element essentially of the character used in automobiles and motor-boats, and 2 is a steering wheel keyed upon the steering post.

3 is a tubular post standard erected from a fixed base of any usual character, which it is not necessary to illustrate.

4 is a hollow, cylindric lock-casing or relatively stationary element mounted upon the upper end of the post standard, or, if desired, integral therewith. It is a casing within which the tumblers of the lock and the bolt member are inclosed.

Within this lock-casing and axially concentric with the steering post, is what I call the tumbler sleeve 5,—it being a sleeve which the tumblers surround, and one within which the steering post is snugly fitted and adapted to have its oscillatory or swinging movement.

6 is a basal flange of the tumbler sleeve, which extends radially to the inner walls of the lock-casing 4 and conveniently rests upon an internal shoulder 7 of said casing. This flange, best seen in Figs. 1, 2 and 10, is at one side peripherally recessed at $6^x$, Fig. 8, to permit of the passage through it of the bolt 19 of the bolt member 18, so as to admit of the vertical movement of said bolt member.

The steering post 1 is provided with an outwardly-extending notched disk 20, Figs. 1, 2, 9 and 10, the notches of which are designated 21 and are equidistantly disposed around the periphery of the notched disk and conveniently in the form of semi-circular openings within which the preferably curved bolt 19 may be entered so as when the parts are in the position shown in Figs. 1, 2, 8 and 9, to lock the steering post.

8 is what I designate a dial head, which is of hollow cylindric form encircling the tumbler sleeve 5, and formed with an outwardly extending dial face 9, Figs. 1, 2, 5 and 10.

The peripheral edge of the dial face 9 rests within a circular seat 5' in the upper edge of the lock casing 4, and upon its upper or outer surface bears the usual radial numerical markings, as shown in Fig. 5, of the dial of a combination lock, which are adapted to be brought into alinement with the usual indicating mark $4^x$, Fig. 5, formed on the upper rim 4' of the lock casing 4.

The upper end of this dial head which extends above the lock casing 4 is conveniently formed with a milled bead $8^x$ by which the rotary manipulation of the dial head and face may be conveniently performed by hand.

Upon the upper face of this bead $8^x$ is inclosed in a plunger-socket 8' a plunger $8^2$ controlled by a spring $8^3$,—the office of which plunger is to seat itself in any one of a plurality of plunger sockets $8^4$, Figs. 2 and 4, formed in the under face of what I call a socket collar $8^5$ encircling the upper end of the tumbler sleeve 5 and conveniently secured thereto by screws $8^6$,—with the result that the dial head and face, while always capable of being rotated in either direction, will always be temporarily held in place and against casual movement wherever the head may be stopped.

The lower end $8^7$ of the dial head 8, which is within the lock casing 4, is at its base formed with a radial, outwardly-extending flange which I term a tumbler 10, Figs. 1, 2, 6 and 10, which is formed with a notch $10^x$, and which as a tumbler corresponds except for its connection with the dial head, with each one of a plurality, in the present instance three, tumblers 11, 12 and 13, being all counterpart, open centered, circular disks and respectively provided with counterpart peripheral notches $11^x$, $12^x$ and $13^x$.

The lowermost tumbler 13 preferably rests upon a shoulder $5^x$ externally formed upon the tumbler sleeve 5, as shown in Figs. 2 and 10,—and the series of the tumblers 10, 11, 12 and 13 are spaced apart by spacing rings 14, 15 and 16, Figs. 2, 5, 6, 7, and 10, each of which is formed with an internally projecting ring-key, the series of these keys being designated respectively $14^{xx}$, $15^x$ and $16^x$, and all, in the mounting or assemblage of the lock as an entirety, being adapted to be entered within a vertically extending key-slot 17, channeled on an exterior face of the tumbler sleeve 5 and also channeled through the socket collar $8^5$, as in the first instance shown in Figs. 2, 5, 6, 7 and 10.

As is usual in combination locks, the tumblers are provided with tumbler-carrying pins 14', upon their respective opposing inside faces, being preferably little headed screws adapted in the setting of the combination to be screwed into threaded pin holes $14^x$ in the tumblers,—which make contact with each other and in the rotary movement of the several tumblers occasioned by the rotation of the dial head, encounter each other so as, tumbler by tumbler, to bring the tumbler notches into alinement, and permit of the action of the bolt member to lock them in alinement or to release them for unlocking the combination.

Referring now to the bolt member of which I make use in my otherwise typical combination lock,—18 designates the bolt member and 19 the bolt, which is adapted to engage with the notches 21 in the notched disk 20 on the steering post 1.

This entire device is illustrated in Figs. 1, 2, 3, 10 and 12, and includes a bar vertically disposed within the lock casing 4, preferably possessing externally and segmentally a curvature corresponding to the cylindric curvature of the interior walls of the lock casing 4, and extending downwardly in the form of an operating rod 22 which passes through a bearing 23 vertically channeled through the base portion of the lock casing 4, so that the protruding end of the rod can be moved upwardly and downwardly.

24 are internally-protruding lock blocks equaling in number the numbers of the tumblers,—equaling in depth the depth of the spacing rings, and adapted when the notches of the tumblers are not in alinement or registry, to interpose themselves between the peripheral edges of the tumblers which latter, therefore, constitute abutments to prevent the up or down movement of the lock and bolt.

In Figs. 1 and 2, in which the notches of the tumblers are not in alinement, these blocks 24 are locked by the edges of the tumblers with which they make contact, and the bolt member 18 as an entirety cannot therefore be moved, and in this position the bolt 19 is in engagement with one of the notches 21 of the notched disk 20 and the steering post and wheel in consequence locked.

In Fig. 10, in which the notches of the tumblers have been brought into alinement, the bolt member 18 and its bolt 19 are shown as raised, so that the bolt 19 has been released from the notches of the notched disk 20, and the steering post and wheel are, in consequence, free to be turned.

Although it is not an essential of my invention, I have shown as a convenient device for supporting or staying the upper end of the bolt member 18,—a circular spring 25 Figs. 1, 2, 6 and 10, which is sprung within the upper part of the lock casing so as to rest above the dial tumbler 10 and serve at its angular ends 26, to bear against correspondingly and oppositely angular faces 27 conveniently formed upon the upper end of the bolt member 18.

In order temporarily to retain the bolt member 18 in either its locked position as in Figs. 1 and 2, or its unlocked position as in Fig. 10, I form in the outer wall of the tumbler sleeve 5 a plunger socket 28, within which is seated a plunger 29 controlled by a plunger spring 30, which plunger is adapted automatically to enter within plunger sockets 31 or 32 formed in the inner face of the bolt 19, which as shown in the drawings protudes from the inner face of the bolt member 18.

Of course, the general form of the bolt member and its bolt may be varied, although the form shown is a convenient one and operates successfully.

It will now be apparent that I have devised a new and useful construction which embodies the features of advantage and operation that I have mentioned, and that while in the present instance I have shown and described a preferred embodiment of it which in practice has given satisfactory and dependable results, it is to be understood that such embodiment may be modified in various particulars without departing from the spirit or scope of the invention or sacrificing any of its advantages.

Having thus described my invention, what I claim as new and desire to secure by Letters Patent, is:—

1. The combination of a relatively rotative element having a radially-extending notched disk, a permutation-lock-mechanism concentrically and axially encompassing the said rotative element and embodying a head having a dial face external of a stationary element, and a tumbler within the stationary element, and also embodying a plurality of tumblers,—the said stationary element inclosing the permutation-lock-mechanism and surrounding the rotative element,—and a bolt member partly within and partly outside of the stationary element, which comprises blocks extending between peripheral edges of the tumblers and adapted when the tumblers are in registry to move through their notches, and comprises also a bolt adapted to engage the notches of the notched disk on the rotative element, the operation of which bolt member either locks or releases the rotative element.

2. The combination of a relatively rotative element having a radially extending notched disk, a permutation-lock-mechanism concentrically and axially encompassing the rotative element and embodying a head having a dial face which rests upon a seat formed in the upper end of a stationary element, and a tumbler within the stationary element, and also embodying a plurality of tumblers,—the said stationary element inclosing the permutation-lock-mechanism and surrounding the rotative element,—a tumbler sleeve within the stationary element within which sleeve the rotative element is turnable as in a bearing,—spacing rings encompassing the tumbler sleeve, separating the tumblers and keyed against rotation about the tumbler sleeve,—and a bolt member partly within and partly without the stationary element, which comprises blocks extending between peripheral edges of the tumblers and adapted when the tumblers are in registry to move through their notches and comprises also a bolt adapted to engage the notches of the notched disk on the rotative element, the operation of which bolt member either locks or releases the rotative element.

3. The combination of a relatively rotative element having bolt-receiving means at its side, a tumbler movable about said rotative element, a stationary element surrounding the tumbler and the rotative element, means surrounding the relatively rotative element and extending within and without the stationary element and constructed and arranged to impart motion to said tumbler, and a bolt member movable in the stationary element alongside and longitudinally of the rotative element and having a bolt for coöperation with the bolt-receiving means of the rotative element and also having means constructed and arranged to coöperate with the tumbler, whereby in one position of the tumbler the bolt is retained in the bolt-receiving means of the rotative element, and in another position of the tumbler the bolt may be displaced from said bolt-receiving means.

4. The combination of a relatively rotative element having bolt-receiving means at its side, a tumbler movable about said rotative element, a stationary element surrounding the tumbler and the rotative element, means surrounding the relatively rotative element and extending within and without the stationary element and constructed and arranged to impart motion to said tumbler, a bolt member movable in the stationary element alongside and longitudinally of the rotative element and having a bolt for coöperation with the bolt-receiving means of the rotative element and also having means constructed and arranged to coöperate with the tumbler, whereby in one position of the tumbler the bolt is retained in the bolt-receiving means of the rotative element and in another position of the tumbler the bolt may be displaced from said bolt-receiving means, and means for preventing casual movement of the bolt member while permitting movement of said member when it is subjected to stress.

5. The combination of a relatively rotative element having bolt-receiving means at its side, a tumbler movable about said rotative element, a stationary element surrounding the tumbler and the rotative element, means extending within and without the stationary element and constructed and arranged to impart motion to said tumbler, a bolt member movable in the stationary element alongside and longitudinally of the rotative element and having a bolt for coöperation with the bolt-receiving means of the rotative element and also having means constructed and arranged to coöperate with the tumbler, whereby in one position of the tumbler the bolt is retained in the bolt-receiving means of the rotative element, and in another position of the tumbler the bolt may be displaced from said bolt-receiving means, means for preventing casual movement of the bolt member while permitting movement of said member when it is subjected to stress, and means for preventing casual movement of the tumbler-moving means while permitting of movement of said means when subjected to stress.

6. The combination of a relatively rotative element having bolt-receiving means at its side, tumblers movable one by the other about the rotative element and each having a peripheral notch, a stationary element surrounding the tumblers and rotative element and having an indicating mark at one end, a tubular head surrounding the rotative element and extending within and without the stationary element and having means for moving the adjacent tumbler and also having a dial face for coöperation with said indicating mark, and a bolt member movable in the stationary element alongside and longitudinally of the rotative element and having a bolt for coöperation with the bolt-receiving means of the rotative element and also having spaced blocks adapted when the notches of the tumblers are registered to pass through said notches.

In testimony whereof I have hereunto signed my name this seventeenth day of April, 1916.

EDMUND W. REUBER.

In the presence of—
J. BONSALL TAYLOR.
WILLIAM I. HITCHINGS.